June 18, 1929.  M. V. MUSSA  1,717,730
GEAR CLUTCH
Original Filed Jan. 21, 1925   2 Sheets-Sheet 1
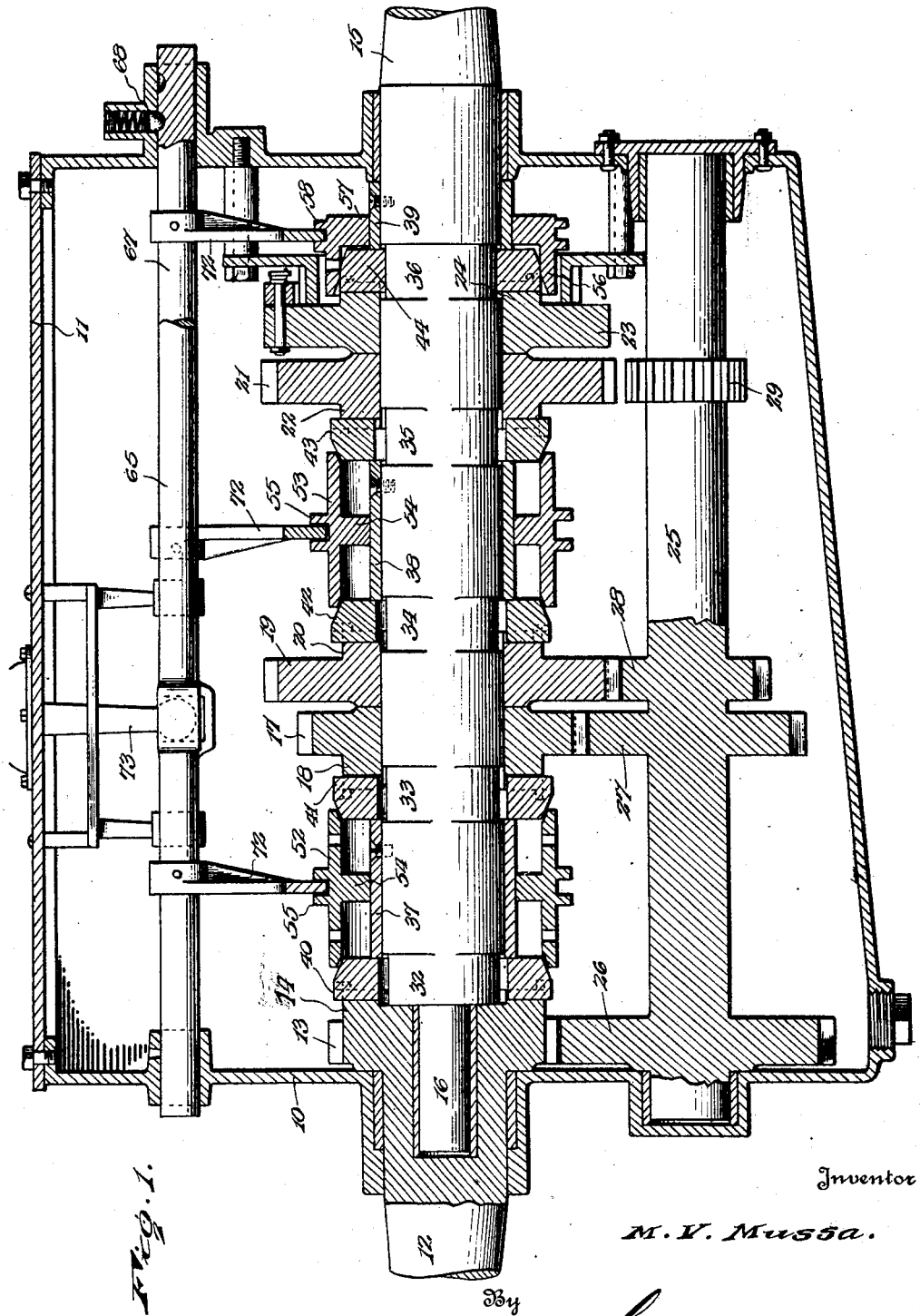
Inventor
M. V. Mussa.
By
Lacey & Lacey, Attorneys June 18, 1929.  M. V. MUSSA  1,717,730
GEAR CLUTCH
Original Filed Jan. 21, 1925   2 Sheets-Sheet  2
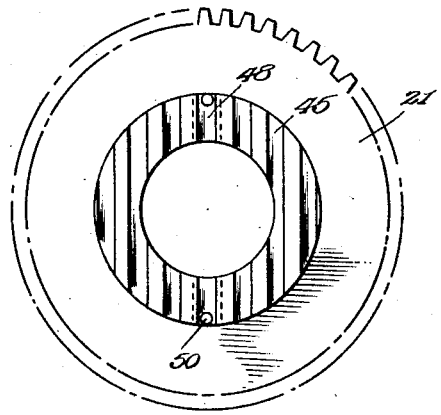
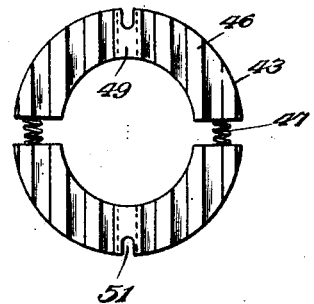
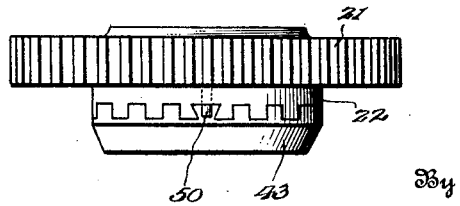
Inventor
M. V. Mussa.
By
Lacy & Lacy, Attorneys Patented June 18, 1929.

1,717,730

UNITED STATES PATENT OFFICE.

MARCEL V. MUSSA, OF PASADENA, CALIFORNIA.

GEAR CLUTCH.

Application filed January 21, 1925, Serial No. 3,839. Renewed February 8, 1929.

The object of this invention is to provide a transmission embodying a novel clutch mechanism in connection with the speed gears for locking said gears to turn with the driven shaft, and wherein said mechanism will be sure and silent in operation.

Other and incidental objects will appear hereinafter.

In the accompanying drawings:

Figure 1 is a vertical sectional view taken longitudinally through the improved transmission.

Figure 2 is a detail elevation of one of the speed gears.

Figure 3 is a detail elevation of one of the clutch collars.

Figure 4 is a plan view showing a gear and clutch collar assembled.

In carrying the invention into effect, I employ a casing 10 closed by a removable cover plate 11, and journaled through the forward end of the casing is a drive shaft 12 provided at its inner end with a high speed gear 13 having a hub 14, the shaft being suitably connected with the source of motive power. Journaled through the rear end of the casing is an alined driven shaft 15 provided at its forward end with a reduced stem 16 journaled in an axial socket in the shaft 12, and loosely mounted on said shaft is a second speed gear 17 having a hub 18, a low speed gear 19 having a hub 20, a reverse gear 21 having a hub 22, and a pawl carrier 23 having a hub 24. The gears 17 and 19 abut while the gear 21 and carrier 23 abut. Journaled below the shafts 12 and 15 is a counter-shaft 25 having integral gears 26, 27 and 28 meshing with the gears 13, 17 and 19, respectively as well as an integral gear 29 meshing with an intermediate gear (not shown), which latter gear, in turn, meshes with the gear 21 to effect reverse rotation thereof.

At spaced points, the driven shaft 15 is channeled to provide elliptical portions 32, 33, 34, 35, and 36, and fixed to the shaft between the portions 32 and 33 as well as between the portions 34 and 35, are surrounding bushings 37 and 38, while at the rear of the portion 36, the shaft carries a similar bushing 39. The purpose of these bushings will later appear. Keyed upon the hubs 14, 18, 20 and 22 of the gears 13, 17, 19 and 21, as well as upon the hub 24 of the carrier 23, to surround the elliptical portions of the driven shaft, are expansible cone-shaped clutch collars 40, 41, 42, 43 and 44, of identical construction. As typically shown in Figure 2, the several hubs are provided with parallel grooves extending chordally thereof respectively while, as typically shown in Figure 3, the several collars are each composed of a pair of mating semi-annular sections and are provided at the larger ends thereof with parallel ribs 46 which slidably engage in the grooves of the hubs. A driving connection is thus provided between the collars and the hubs while, however, the sections of the collars may shift away from the shaft, and interposed between the ends of said sections are springs 47 seated in suitable sockets in the sections for normally holding said sections apart. As further typically shown in Figures 2, 3 and 4 of the drawings, the centrally located groove of each hub, as indicated at 48, is of dove-tail formation while the corresponding rib of each collar, as indicated at 49, is of like formation so that endwise separation of the collars and hubs is prevented. Furthermore, each hub is provided near the outer ends of the groove 48 thereof with pins 50 while the rib 49 of each of the collar sections is formed at its outer end with a notch 51 to slidably accommodate said pins so that the pins will thus function to limit the separating movement of the collar sections. As will be observed, the collars coact with the bushings 37, 38 and 39 for limiting relative endwise movement of the shafts 12 and 15 and the gears thereon as well as the pawl carrier.

Journaled upon the bushing 37 is a sleeve 52, the ends of which overlap the collars 40 and 41, and journaled upon the bushing 38 is a like sleeve 53, the ends of which overlap the collars 42 and 43. The sleeves are provided medially with internal annular flanges 54 which fit the bushings, while the ends of the sleeves are internally beveled to fit the tapered ends of the collars. Formed on said sleeves externally thereof are encircling parallel flanges 55. Journaled upon the bushing 39 is a sleeve 56 surrounding the collar 44 and beveled internally to fit the tapered end of the collar. Said sleeve, like the others, is provided with a flange 57 which fits the bushing, as well as with external flanges 58 like the flanges 55.

As will now be seen in view of the foregoing, the sleeve 52 may be moved forwardly over the collar 40 for shifting the sections of said collar toward each other and clamping said sections about the portion 32 of the shaft 15 thereby locking the gear 13 and the shaft to turn in unison, thus giving high speed. Similarly, the sleeve 52 may be moved rearwardly for clamping the sections of the collar 41 about the portion 33 of the shaft 15 and locking the gear 17 and the shaft to turn in unison, thus giving second speed. Likewise, the sleeve 53 may be moved forwardly for clamping the sections of the collar 42 about the portion 34 of the shaft 15 and locking the gear 19 and the shaft to turn in unison, thus giving low speed, while by moving the sleeve 53 rearwardly over the collar 43, the sections of this collar will be clamped about the portion 35 of the shaft for locking the gear 21 and the shaft to turn in unison, thus giving reverse. The sleeve 56 normally stands in its forward position, as shown in Figure 1, engaging over the collar 44 for clamping said collar about the portion 36 of the shaft 15 and locking the carrier 23 and said shaft to turn in unison. Thus, the carrier normally rotates with the shaft and it cooperates with a ratchet device to prevent retrograde movement of the shaft, but when the gear is shifted to reverse, the sleeve 56 is also shifted to release the carrier. The ratchet device is not claimed herein and is, therefore, not described in detail.

Slidable through the upper portion of the casing 10 are shifter rods as 65 and 67 provided at their rear ends with locating sockets, and selectively engageable in said sockets are spring pressed detents 68. The shifter rods are provided with yokes of well-known form. Depending from the shifter rods are shifter forks 72 engaging between the flanges 55 and 58 of the sleeves 52, 53 and 56. Mounted for universal movement on the cover plate 11 of the casing 10 is a shift lever 73, the inner end of which is formed to coact with the yokes on the shifter rods in the usual manner to selectively set the gears.

Having thus described the invention, what I claim is:

1. The combination of a shaft, a gear loose thereon and having chordal grooves in one side, clutch jaws provided with chordal ribs slidably engaged in said grooves, said jaws encircling and normally free of the shaft, means for restraining the jaws against movement axially of the shaft, and means for forcing the jaws together whereby to clamp the shaft and lock the gear thereto.

2. The combination of a shaft, a gear loose thereon, clutch jaws slidably mounted on one side of the gear and encircling the shaft, means yieldably holding the jaws out of contact with the shaft, the jaws having beveled outer ends, and a sleeve slidable along the shaft and having an end overlapping the beveled ends of the jaws whereby to cause the jaws to clamp the shaft and lock the gear thereto.

In testimony whereof I affix my signature.

MARCEL V. MUSSA. [L. S.]